(No Model.)
J. A. HOOPER.
MEASURING VESSEL.
No. 534,154. Patented Feb. 12, 1895.
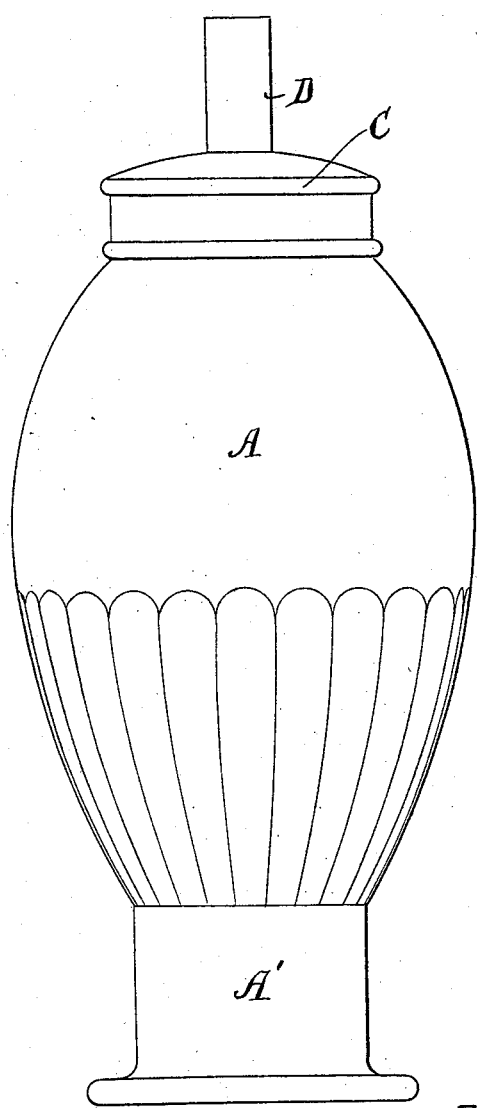
Fig. 1.
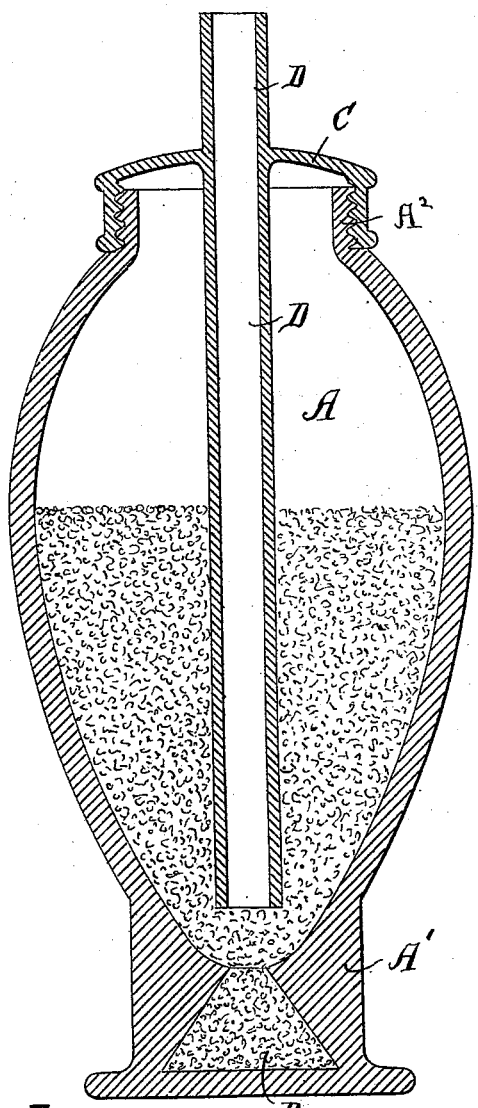
Fig. 2.
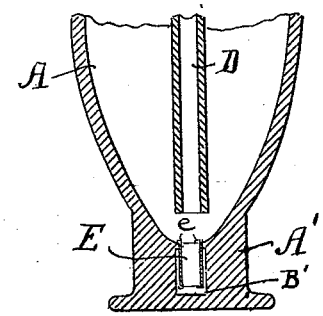
Fig. 3.
Fig. 4.
Witnesses
Winifred G. Kerwin
Edward G. Brown
Inventor
John A. Hooper
by Edwin Planta
Attorney.

UNITED STATES PATENT OFFICE.

JOHN A. HOOPER, OF BOSTON, MASSACHUSETTS.

MEASURING-VESSEL.

SPECIFICATION forming part of Letters Patent No. 534,154, dated February 12, 1895.

Application filed March 7, 1894. Serial No. 502,659. (No model.)

*To all whom it may concern:*

Be it known that I, JOHN A. HOOPER, a citizen of the United States, residing at Boston, in the county of Suffolk and State of Massachusetts, have invented certain new and useful Improvements in Measuring-Vessels for Sugar or other Granulated or Powdered Substances, of which the following, taken in connection with the accompanying drawings, is a specification.

The object of my invention is to produce a measuring vessel for sugar or other granulated or powdered substances.

The invention consists of a vessel having a chamber at its lower end of a size to contain the amount it is desired to measure, the upper end of the vessel being closed by a cap having a tube passing through it which tube extends down to within a short distance of the measuring chamber so that when the vessel is turned over, the contents of said measuring chamber will pass through the tube as hereinafter fully described and set forth in the claims.

Referring to the accompanying drawings: Figure 1— represents a side view of a measuring vessel embodying my invention. Fig. 2— is a vertical section of the same. Figs. 3 and 4— are views of a modification particularly adapted for powdered substances.

A, represents the main portion or body of the vessel which is contracted at its lower end and leads to a conically shaped measuring chamber B, formed in the base A'. This chamber is of such a size as to contain the amount of sugar or other article that it is desired to supply when the body A is turned over. The upper end of the body A is formed with a neck $A^2$ screw threaded on the outside onto which is screwed a cap or cover C, having a tube D, through its center, the lower end of which extends down near to the top of the chamber B, and its upper end projects a short distance above the cover.

The operation is as follows: Supposing the vessel is intended to contain sugar, then the chamber B would be made to hold say one teaspoonful. The cover C, and with it the tube D, is first removed from the body A. Sugar is then placed in the body A, until it is nearly full. The tube D, is then inserted and the cap or cover C, screwed on. The vessel is then turned over to discharge the sugar contained in the tube D, and the apparatus is then ready for use. Now by turning the vessel bottom side up, the sugar contained in the body A, will fall toward the cap or cover C, but the sugar contained in the conical measuring compartment B, will be emptied into the tube D, and run out at its upper end. Now by reversing the vessel so as to cause it to stand right side up the sugar will fall to the bottom and fill the compartment B, ready to discharge the required quantity through the tube D, when the vessel is again turned over. Thus it will be seen that one teaspoonful of sugar will be delivered each time the vessel is turned over until the same is completely emptied.

When the vessel is intended to contain powdered substances, I prefer to form the chamber B', straight as shown in Fig. 3, and insert a small tube E, free to slide therein which tube is provided at each end with small lips $e$, (see Fig. 4) to prevent said tube from dropping too far down into or out of the chamber B', but so that when the vessel is turned over, the tube E will fall and conduct the powder into the tube D.

Of course the measuring compartment B will have to be varied in size according to the article the vessel contains and the quantity it is desired to deliver at one time. Thus for coffee it would have to hold one tablespoonful, and for baking powders say one half teaspoonful.

What I claim is—

1. A measuring vessel, the bottom of which is provided with a substantially conical cavity communicating with the interior of the vessel at its apex or smaller end, the walls of the cavity intersecting the inner surface of the vessel in lines approaching each other, whereby the contents of the cavity will be delivered therefrom in a straight contracted stream, and a delivering tube projecting through the cover of the vessel and having its lower end adjacent to and in a line with the opening of the cavity, substantially as set forth.

2. A measuring vessel, the lower portion of which is provided with an opening and a measuring chamber communicating with the interior of the vessel through said opening, a discharge tube projecting through the cover of the vessel and having its inner end in close proximity to and in line with the opening, and means for changing the size or capacity of the measuring chamber, substantially as set forth.

3. A vessel for containing powdered substances consisting of a body having a chamber at its lower end, a tube free to slide therein, a cap or cover for said body and a tube to receive the contents from the sliding tube and deliver the same from the vessel substantially as set forth.

In testimony whereof I have signed my name to this specification, in the presence of two subscribing witnesses, on this 27th day of February, A. D. 1894.

JOHN A. HOOPER.

Witnesses:
CHAS. STEERE,
EDWIN PLANTA.